United States Patent Office 3,660,413
Patented May 2, 1972

3,660,413
PHOSPHOROTHIOAMIDES
Lindley A. Cates, Houston, Tex., assignor to Research Corporation, New York, N.Y.
No Drawing. Filed Aug. 25, 1969, Ser. No. 852,945
Int. Cl. C07d 31/50
U.S. Cl. 260—294.8 K                    6 Claims

ABSTRACT OF THE DISCLOSURE

Antibacterial phosphorothioamides are prepared by the reaction of phosphorothiocyanates with hydrazine or hydrazides.

---

The invention described herein was made in the course of work under a grant or award from the Department of Health, Education and Welfare.

This invention relates to novel phosphorothioamide compounds exhibiting antibacterial activity.

The phosphorothioamide compounds of the invention are of the general formula $$(RO)_2PONHCSY$$
$$ROPO(NHCSY)_2$$

and $$PO(NHCSY)_3$$

wherein Y is H, $N(CH_2)_2$, $NHNHC_6H_5$, $$NHNHCOOR$$

or $NHNHCOC_5H_4N$ and R is lower alkyl. As used herein, the term "lower alkyl" embraces alkyl radicals, branched or straight-chain, having 1–4 carbon atoms inclusive, e.g., methyl, ethyl, propyl, isopropyl and the butyls.

The phosphorothioamide compounds of the invention are generally prepared by the reaction, usually condensation, of a phosphorothiocyanate with a hydrazine or hydrazide. The reaction is usually effected in the presence of an inert solvent, e.g., ether or carbon tetrachloride, in the cold by adding a solution of one of the reactants to the other dissolved in the same solvent chilled to about 5–10° C. The product generally precipitates from the reaction mixture but can also be recovered by evaporation of the product. The crude product is purified by solvent recrystallization, e.g., ether-alcohol.

Representative compounds of the invention were screened against three gram-positive and gram-negative microorganisms using the agar diffusion-filler paper disc method and found to exhibit significant antibacterial activity.

EXAMPLE 1

$$(C_2H_5O)_2PONHCHS$$

To a chilled solution of diethyl phosphoroisothiocyanidate $(C_2H_5O)_2PONCS$, Can. J. Chem., 37, 525 (1959), dissolved in chilled ether was gradually added an equimolar qantity of hydrazine dissolved in the same solvent. After separation and recrystallization, the $$(C_2H_5O)_2PONHCHS$$

product melted 129° C. with decomposition.

Reduction of the phosphoroisothiocyantidate reactant and the same product was obtained when 4-methyl-3-thiosemicarbazide was substituted for hydrazine.

EXAMPLE 2

$$(C_2H_5O)_2PONHCSNHNHC_6H_5$$

Using the procedure of the previous example, phenylhydrazine was condensed with diethyl phosphoroisothiocyantidate to give $(C_2H_5O)_2PONHCSNHNHC_6H_5$ melting 125° C. with decomposition.

Similar products are obtained when phenylhydrazine bearing substituents such as alkyl, halo, alkoxy and the like on the phenyl ring is substituted for phenylhydrazine.

EXAMPLE 3

$$(C_2H_5O)_2PONHCSNHNHCOOC_2H_5$$

Using the procedure of the previous examples, ethyl carbazate $H_2NNHCOOC_2H_5$ was condensed with diethyl phosphoroisothiocyantide to give $$(C_2H_5O)_2PONHCSNHNHCOOC_2H_5$$

melting 147° C. with decomposition.

EXAMPLE 4

$$(C_2H_5O)_2PONHCSNHNH\text{-}4\text{-}COC_5H_4N$$

Using the procedure of the previous examples, but no solvent, pyridine-4-carboxylic acid hydrazide $$H_2NNH\text{-}4\text{-}COC_5H_4N$$

was condensed with diethyl phosphoroisothiocyantidate to give $(C_2H_5O)_2PONHCSNHNH\text{-}4\text{-}COC_5H_4N$ melting 147° C. with decomposition.

EXAMPLE 5

$$C_2H_5OPO(NHCSNHNHCOOC_2H_5)_2$$

To a chilled solution of ethyl phosphorodiisothiocyantidate $C_2H_5OPO(NCS)_2$, Saunders et al., J. Chem. Soc. 699 (1948), dissolved in chilled ether was gradually added a solution containing twice the equimolar quantity of ethyl carbazate. Unlike the other examples, 1 hour's heating at 35° C. was required to complete the reaction. After separation and recrystallization, the $$C_2H_5OPO(NHCSNHNHCOOC_2H_5)_2$$

product decomposed about 80° C. before melting.

EXAMPLE 6

$$C_2H_5OPO(NHCSNHNH\text{-}4\text{-}COC_5H_4N)_2$$

Using the procedure of the previous example, but acetonitrile as the solvent, pyridine-4-carboxylic acid hydrazide was added to ethyl phosphorodiisothiocyantidate to give $C_2H_5OPOCNHCSNHNH\text{-}4\text{-}COC_5H_4N$ decomposing about 105° C. before melting.

EXAMPLE 7

$$C_2H_5OPO(NHCSNHNHCOOC_2H_5)$$
$$(NHCSNHNHC_6H_5)$$

Following the general procedure, equimolar quantities of phenylhydrazine and ethyl carbazate were sequentially added to a solution of ethyl phosphorodiisothiocyantidate to give $$C_2H_5OPO(NHCSNHNHCOOC_2H_5)$$
$$(NHCSNHNHC_6H_5)$$

which separated as a yellow oil before solidifying. The solid decomposed about 65° C. before melting.

EXAMPLE 8

(C₂H₅OPO(NHCHS)[NHCSN(CH₂)₂]

Essentially following the procedure of the previous example, ethanethiol and then aziridine were added to ethyl phosphorodiisothiocyantidate in ether. Reduction followed by condensation gave

C₂H₅OPO(NHCHS)[NHCSN(CH₂)₂]

which decomposed about 147° C. before melting.

EXAMPLE 9

PO(NHCSNHNHCOOC₂H₅)₂

To a chilled solution of phosphinylidyne triisothiocyanate PO(NCS)₃. Saunders et al., J. Chem. Soc., 699 (1948) dissolved in chilled ether was gradually added a solution containing triple the equimolar quantity of ethyl carbazate. After separation and recrystallization, the PO(NHCSNHNHCOOC₂H₅)₃ product decomposed about 53° C. before melting.

In general, all of the products described were analyzed for and gave satisfactory C, H and N analyses. Infrared spectra of the products on a Beckman spectrophotometer gave the expected absorptions. All products decomposed on melting or decomposed over a wide range before melting.

The antibacterial spectra were determined by saturating 12.7 mm. filter paper discs with 2 drops of an aqueous or alcoholic solution or suspension of the compound (20 mg./ml.) and placing these on nutrient agar seeded with 48-hour nutrient culture broths of the test organisms (0.5 ml.). The zones of inhibition around the discs were measured after 4 days of incubation at 37° C. The first value given in the table below is the zone of complete inhibition; the value in parentheses which follows is the zone of complete and partial inhibition also in millimeters.

| Compound | Solvent | M. smegmatis | S. aureus | γ-Strep. | E. coli | P. vulgaris | Ps. aerugi nosa |
|---|---|---|---|---|---|---|---|
| 1 | EtOH | 25 (35) | | | | | |
| 1 | H₂O | 17 (25) | | | | | |
| 2 | EtOH | 25 (33) | 20 | | 24 | | |
| 4 | EtOH | 42 (54) | 19 | | 20 | 18 (22) | 19 | 19 |
| 5 | H₂O | 15 (21) | 20 | | | | |
| 6 | H₂O | 36 (39) | | | | | |
| 7 | EtOH | | 18 | 17 | | | 15 |
| 9 | H₂O | | 19 | 18 | | | 15 |

I claim:
1. A compound of the group having one of the following structures

(RO₂)PONHCSY

ROPO(NHCSY)₂ wherein Y is NHNH-4-COC₅H₄N and R is lower alkyl.
2. A compound according to claim 1 wherein Y is NHNH-4-COC₅H₄N and R is ethyl.
3. C₂H₅OPO(NHCSNHNH-4-COC₅H₄N)₂.
4. (C₂H₅O)₂PONHCSNHNH-4-COC₅H₄N.
5. PO(NHCSNHNHCOOC₂H₅)₃.
6. A compound of the formula:

PO(NHCSY)₃ wherein Y is NHNHCOOR and R is lower alkyl.

References Cited

Tolkmith: J. Am. Chem. Soc., vol. 84, pp. 2097–2104 (1962).

Burger: Medicinal Chemistry, Second edition, Interscience Publishers, pp. 973, 974 and 977, RS 403 B–8, 1960 C.7.

Tolkmith: Chem. Abstracts, vol. 57 pp. 8415–g to 8417–e. (October 1962).

ALAN L. ROTMAN, Primary Examiner

U.S. Cl. X.R.

260—481 C, 923, 938, 947; 424—212, 263

UNITED STATES PATENT OFFICE
CERTIFICATE OF CORRECTION

Patent No. 3,660,413   Dated May 2, 1972

Inventor(s) Lindley A. Cates

It is certified that error appears in the above-identified patent and that said Letters Patent are hereby corrected as shown below:

In column 4, line 23, --,NHNHCOOR -- should be inserted before "and".

Signed and sealed this 12th day of September 1972.

(SEAL)
Attest:

EDWARD M. FLETCHER, JR.
Attesting Officer

ROBERT GOTTSCHALK
Commissioner of Patents